WIDE BAND DATA RECORDING AND REPRODUCING SYSTEM AND METHOD

Filed Dec. 21, 1959 2 Sheets-Sheet 1

BERNARD M. BRENNER &
WILLIAM BARNHART
INVENTORS

BY Harvey G. Lambert
ATTORNEY

WIDE BAND DATA RECORDING AND REPRODUCING SYSTEM AND METHOD

Filed Dec. 21, 1959 2 Sheets-Sheet 2

BERNARD M. BRENNER &
WILLIAM BARNHART
INVENTORS

BY Harvey G. Lowhurst
ATTORNEY

United States Patent Office 3,012,106
Patented Dec. 5, 1961

3,012,106

WIDE BAND DATA RECORDING AND REPRODUCING SYSTEM AND METHOD

Bernard M. Brenner, Menlo Park, and William Barnhart, Palo Alto, Calif., assignors to Ampex Corporation, Redwood City, Calif., a corporation of California Filed Dec. 21, 1959, Ser. No. 860,871
12 Claims. (Cl. 179—100.2)

This invention relates generally to a wide band data recording and reproducing system and method, and more particularly to a system in which the recorded information is in the form of transverse longitudinally spaced track portions.

In copending application Serial No. 506,182, filed May 5, 1955, now U.S. Patent No. 2,916,547, there is described a wide band recording system in which a plurality of equally spaced transducing units are mounted on the circumference of a rotating disc. During recording, the disc is rotated at relatively high rotative speeds as the recording medium is moved longitudinally. The transducing units record successive transverse longitudinally spaced track portions on the recording medium. The side margins of the tape may be erased and a control signal longitudinally recorded thereon. The control signal may then be used during reproduction to control the relative speed of the tape and disc so that the magnetic heads can properly scan the recorded track portions.

During recording, all transducing units are fed with the same signal input. The width of the tape is so selected that duplicate information appears toward the end of one record track portion and at the beginning of the succeeding record track portion. During reproduction advantage is taken of the duplicate information for switching from one head to another.

The tape transport used for the system is similar to those used in professional magnetic tape recording machines. The tape is supplied from a supply reel, passes by the rotating transducer units, passes by erase heads which erase strips at the top and bottom of the tape for recording audio and control signals, past audio and control track transducing units, and is stabilized in its rate of movement by being passed through an idler whose motion is dominated by a heavy fly wheel. The tape next passes between a drive capstan and pressure idler, around take-up idlers and onto a take-up reel. The tape is guided past the rotating disc assembly by a concave guide which cups the tape so that it conforms to the circular sweep path of the transducer units. The tape is held for intimate and good contact at very nearly constant pressure with the transducer units.

In copending application Serial No. 720,329, filed March 10, 1958, now U.S. Patent No. 2,942,061 there is described a system for moving the tape guide toward and away from the transducer units to correct for any timing errors which might occur during recording and reproduction by changing the transverse stretch of the tape. These errors might arise from head wear, dimensional changes of the tape and the like. The compensating system described in said application is suitable for a video recording system in which the information being recorded includes timing data, for example, television signals. The system detects variations in the timing data and derives a signal which is employed to control the position of the guide to thereby control the head to tape pressure. The variations in the timing data of the reproduced signal are automatically compensated. The tape guide may be moved towards and away from the drum by means of a servo motor and suitable mechanical coupling.

Often, however, the signal which is recorded does not contain timing information. In such instances, and also where the timing information which is present is not sufficiently precise, there is a need for some means of controlling the time relationship of the data signals played back from the different heads. Where, due to operative changes in tapes or heads, errors are caused to occur in the speed at which the transverse track is scanned, the data signals are not correctly presented. There is either a time gap between the signals derived from adjacent heads, or a repetition of the same data. These irregularities, known as switching errors, should be minimized as much as possible. The techniques employed should not affect the inherently wide band operation of the system.

It is therefore an object of the present invention to provide an improved system for deriving information at a controlled rate from a record medium.

It is another object of this invention to provide a system for recording and playing back information on a magnetic recording medium in a continuous and controlled fashion.

It is yet another object of the present invention to provide means for operating a wide band recording system at a high rate of speed but without timing signals imposed upon the data signals.

It is also an object of the present invention to provide a recording system for compensating for timing errors which arise during the recording process.

It is another object of the present invention to provide a system in which timing pulses are added in the duplicate information portions of the record tracks in such a manner that the information does not appear in the composite reproduced signal.

It is a further object of the present invention to provide a system of the above type in which the timing pulses are reproduced and compared to derive an error signal which is employed to compensate for any timing errors introduced in the recording and reproducing process due to changes in tape dimensions, changes in head protrusion (wear between the recording and play-back machines), and any changes in the position of the female guide between recording and reproduction, or during either recording or reproduction.

In accordance with the present invention a wide band recording system of the type which records separate tracks transversely on a magnetic tape may generate its own timing information. Regions at the opposite ends of adjacent tracks, in which data is redundantly recorded, may include inserted paired timing signals which are separated by an amount corresponding to a selected time interval. On playback, reading of a first of the paired signals may initiate generation of a reference pulse after the selected time interval. The second of the paired signals and the reference pulse may then be compared and a control signal may be generated from the comparison which is suitable for adjusting the position of the guide relative to the associated transducers. Thus, the scanning of the transverse track may be altered to compensate for dimensional variations in the tape or other changes in operating conditions.

These and other objects of the invention will become more clearly apparent from the following description when taken in conjunction with the accompanying drawing.

Referring to the drawing.

Figure 3:
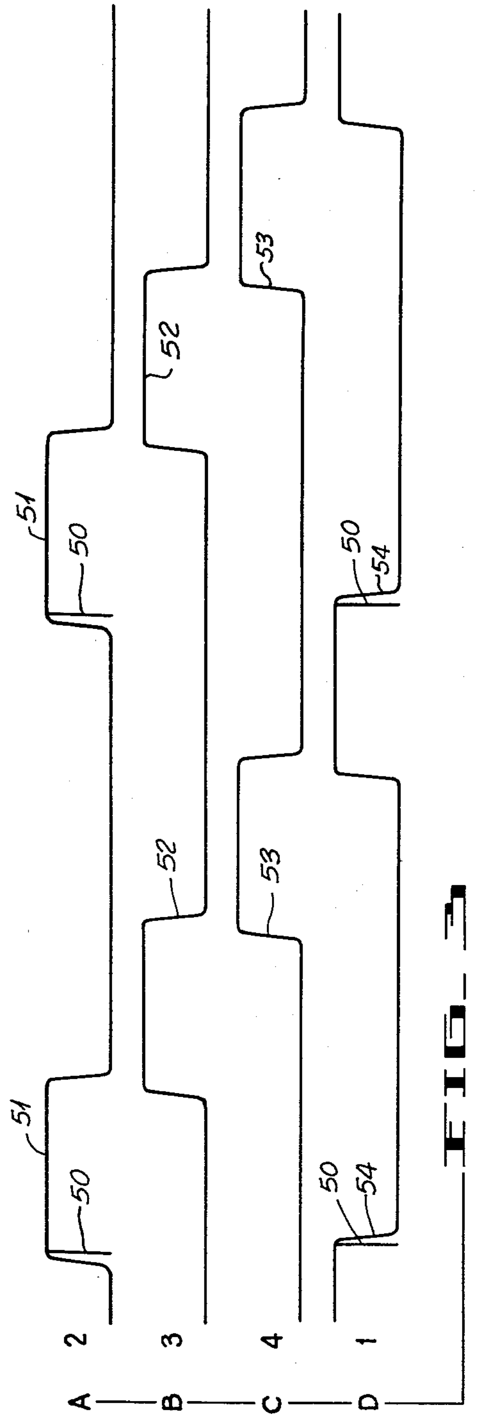
Figure 5:
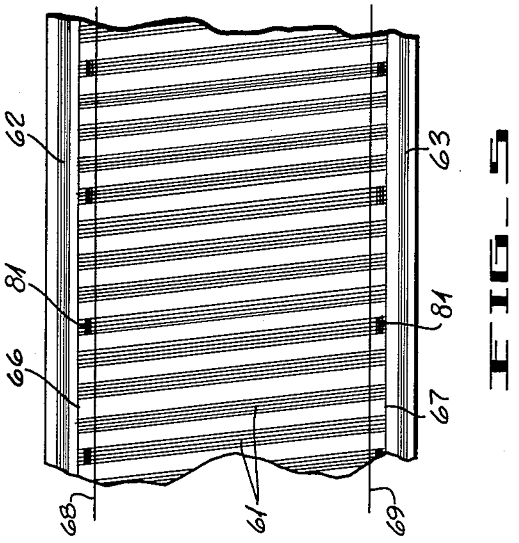
Figure 4:
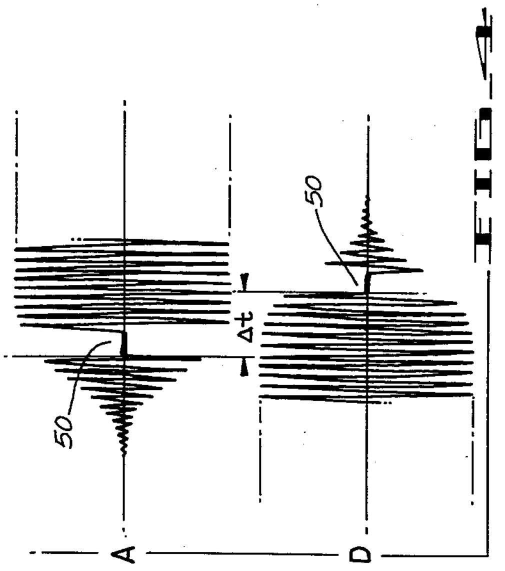

FIGURE 3 schematically illustrates the waveforms of recorded wide band data and timing pulses in accordance with the present invention;

FIGURE 4 is an enlarged view of representative waveforms, showing in more detail the timing pulses applied between adjacent heads;

FIGURE 5 is a view schematically showing a "developed" record to more clearly illustrate the transverse record tracks with timing information applied thereto.

Figures 1, 2:
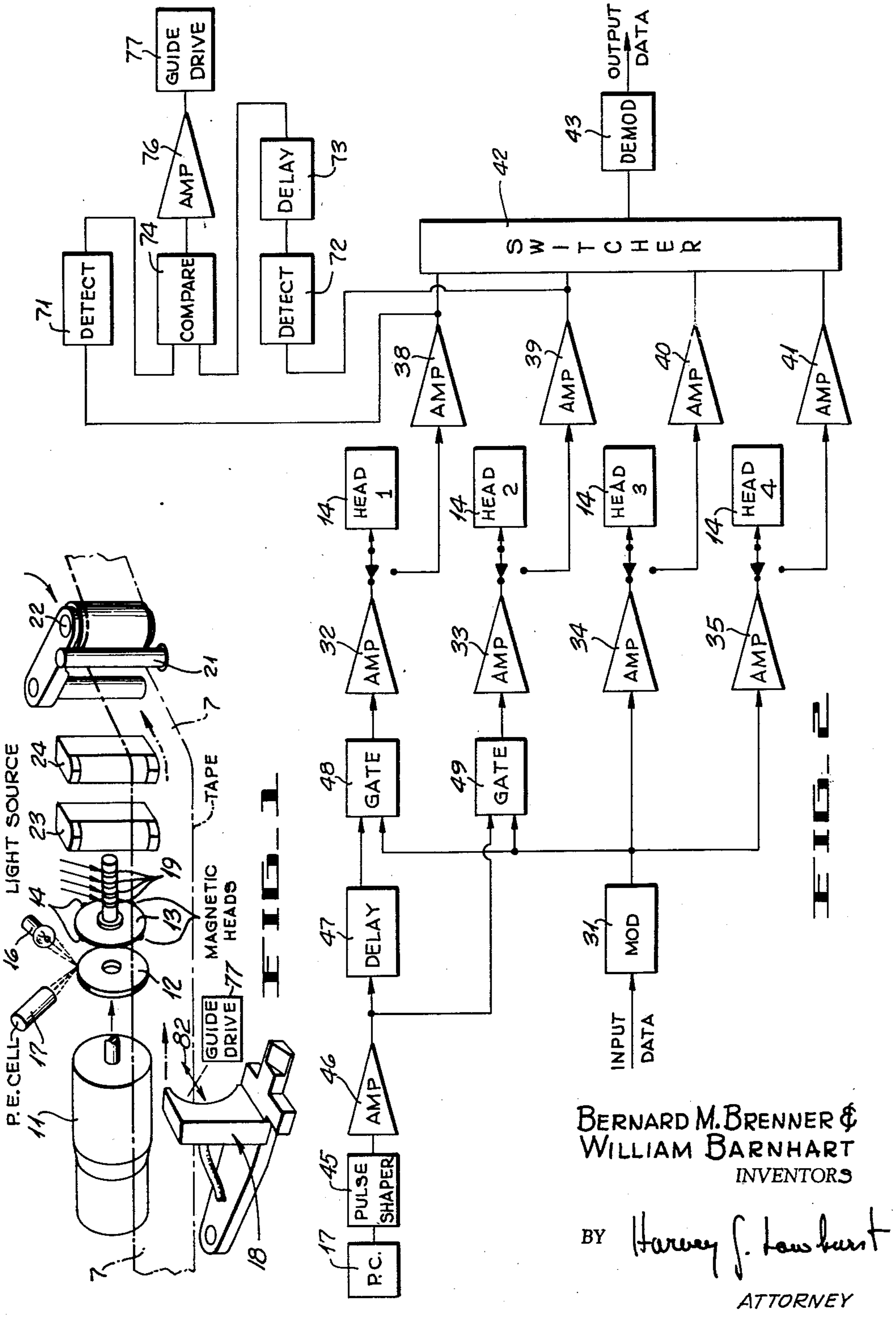
FIGURE 1 is a schematic diagram illustrating the rotating head assembly, tape guide, control and sound track record and reproduce heads, and the capstan drive.
FIGURE 2 is a block diagram of a system in accordance with the invention.

Referring to FIGURE 1, there is shown a system for recording and reproducing information using a magnetic tape 7. A drive motor 11 rotates a reference disc or drum 12 the periphery of which may be coated half black and half white for reasons to be presently described, and a transducer disc or drum 13 which carries a plurality of transducing units 14, which may be magnetic heads. Here first through fourth magnetic heads 14 are employed. A light source 16 impinges light onto the coated disc 12. Reflected light is picked up by a photoelectric cell 17. With the disc coated half black and half white, the output of the photocell will be a series of symmetrical, substantially square wave pulses having a frequency corresponding to the rotational speed of the motor 11. The reference disc 12 and transducer disc 13 are coupled to rotate in fixed relation.

A female guide 18 maintains the tape 7 in a cupped relationship adjacent to the revolving transducer disc 13 whereby the magnetic heads 14 are in intimate contact with the tape 7 as they move through their circular sweep path. Suitable slip ring segments 19 are provided for applying and removing signals from the rotating heads 14. The tape 7 is drawn longitudinally past the heads 14 by a capstan 21 which operates in conjunction with a capstan idler 22.

The tape 7 is also drawn past a sound track and control track erase head assembly 23 which erases any recording formed on the side margins of the tape 7. A sound track and control track record and playback head assembly 24 is adapted to record and reproduce signal information along the side margins of the tape 7 in the form of longitudinal tracks.

During recording, the signal from the photocell 17 is employed to lock in the speed of the capstan 21 with the speed of the revolving heads 14. The output from the photocell 17 is also processed and recorded on the control track of the tape 7. The control track then becomes the magnetic equivalent of the sprocket holes of a sprocketed film machine. This information is available as a reference frequency to control the relative positions of the transducer disc 13 and capstan 21 shaft during reproduction or playback.

During playback, the photoelectric cell 17 produces a signal representative of the rotational velocity of the motor 11. The signal is fed to a phase comparator (not shown in FIGURE 1). The control track reproduce head in the assembly 24 reproduces the recorded control signal and simultaneously feeds it to the comparator. The comparator produces a resultant signal which is a function of the phase difference between the applied signals. This signal is applied to control an oscillator. The output of the oscillator is fed to an amplifier which drives the capstan motor. The effect of this is to cause the capstan to revolve during replay in exactly the same relation to the revolving disc within narrow limits as it did during the recording process. The elements and operation of these control systems for recording and playback are set out in detail in the previously mentioned copending applications, and have only been summarized here for reference.

Circuits in accordance with the invention, for establishing correct time relationships in recorded and reproduced information are illustrated in FIGURE 2. The circuits may include a modulator 31 which serves to modulate a carrier in accordance with the input data and apply the modulated carrier to the record amplifiers 32—35. The signal to two of the record amplifiers 32 and 33 is gated in a manner to be presently described. The outputs from the amplifiers 32—35 are applied separately to the individual first to fourth recording heads 14

(FIGURE 1) carried by the rotating disc 13. Electrical couplings are made by switch means (indicated generally).

During reproduction, the four magnetic heads are connected by the switching means to individual preamplifiers 38—41 (FIGURE 2). The output of the preamplifiers 38—41 is applied to a switcher 42 which derives a composite output signal. The switcher 42 takes the signal from one magnetic head 14 at a time, switching from one preamplifier 38, 39, 40 or 41 to the next at a moment which serves to eliminate the timing pulses and duplicate data from the composite output signal. A suitable electronic switcher which may be employed for the switcher 42 is described in copending application Serial No. 614,420, filed October 8, 1956, now U.S. Patent No. 2,968,692. It is controlled from the output of the photoelectric cell 17 to switch at the exact instant of time required. The composite output from the switcher 42 is demodulated by demodulator 43 to derive the wide band output (reproduced) signal.

It is observed that the time required for a single sweep of a revolving reproduce head 14 across the tape 7 is dependent upon the length of the track (with respect to the width of the tape) at the instant of playback. This length (equivalent to time), in relation to its value at the time of recording, is a function of (*a*) change in tape dimensions due to environments; (*b*) change in head protrusion (wear) between recording and playback machines; and (*c*) changes in position of the tape guide. Any of these changes will change the timing of the output information. To compensate for the first two effects, the position of the female guide 18 (FIGURE 1) is mechanically positioned in such a way that the same time is required to scan a transverse track during playback as during recording. If proper compensation is not achieved during each head pass, however, the recording is played back slower or faster than originally recorded. Thus, immediately after switching there will be either a gap in the data, or a repetition of part of the data, corresponding, respectively, to the slow or fast playback previously mentioned.

In accordance with the present invention, a system is provided for introducing timing pulses in the recorded signal in the duplicate or redundant portions of the signal recording and for employing said timing pulses for controlling the position of the tape guide 18 to thereby compensate or correct for the aforementioned errors by changing the tape dimension.

For this purpose, pulses of controlled duration are initiated by the leading edges of square waves from the photocell 17. A pulse shaper 45 which may in one example include a differentiating circuit and a one-shot multivibrator, generates a pulse 50 of controlled duration beginning substantially concurrently with the leading edge of a selected wave from the photocell 17. Other means, such as a special pattern on the reference disc 12, or a different type of pickup, will suggest themselves to those skilled in the art. The signal derived from the amplifier 46 is applied to a delay means 47, and then applied to a gate circuit 48. The amplified signal is also applied directly to a different gate circuit 49. The gate circuits, referred to hereafter simply as gates, 48 and 49 serve to gate the modulated input data signals to the amplifiers 32 and 33 which are associated with the first and second recording heads 14. Normally, the gates 48 and 49 are open, passing the data signals. However, whenever the photoelectric cell 17 picks up the leading edge of a signal from the reference disc 12, the signal is shaped by the amplifier 46 into a timing pulse. The timing pulse is applied to the gates 48, 49 to inhibit the data signal, and thus to momentarily cut off or blank the data signal to the amplifiers 32 and 33. The timing pulse applied to cut off the second head 14 from the associated amplifier 33 precedes the timing pulse applied to the first head 14 by an amount which corresponds to the delay introduced by the delay line 47. Thus, paired time separated timing pulses 50 (FIGURES 3 and 4) are formed. The width or duration of each timing pulse is dependent upon the signal applied from the amplifier 46 and may be in the order of one or two microseconds wide, while the delay may be of the order of ten microseconds.

It is noted that the second head has the timing pulse applied prior to the first head. Referring particularly to FIGURES 3 and 4, this is more clearly illustrated. The signal information is recorded as illustrated in greatly simplified fashion in FIGURES 3A–D. The second head records during the period of time represented by the waveforms 51; the third head during the time represented by waveforms 52; the fourth head during the time represented by waveforms 53; and the first head during the time represented by the waveform 54. It is seen that the first head is recording the same data signal as the second head during an interval immediately after the first head begins recording. The timing pulse is added to blank the data signal at the second head prior to blanking of the signal at the first head as indicated in FIGURE 4 by the time $\Delta t$. The time $\Delta t$ corresponds to the delay introduced by delay 47.

The enlarged waveform illustrated in FIGURE 4 shows the pattern of an R-F recorded signal which may be frequency modulated or amplitude modulated. The action of the blanking means is to clamp the signal to the zero axis, or in another sense, to remove the signal entirely for the timing pulse duration. The waves of FIGURE 4 are more representative of actual waveforms and timing relationships, of course, than are the idealized envelope representations of only half of the R-F envelope shown in FIGURE 3.

If switching is later carried out during playback so that the switching occurs during the time $\Delta t$, the timing pulse is eliminated from the output of the first head and from the output of the second head. The composite signal which is played back is then free of timing information.

This fact is also indicated in the "developed" recording shown in FIGURE 5. The transverse tracks are shown at 61, while the upper and lower longitudinal record tracks are shown at 62 and 63. The transverse track portions between the edges 66 and 67 and the lines 68 and 69, respectively, represent the redundant or duplicate information. The dark pips 81 represent the timing pulses 50 referred to above. It is observed that if switching takes place so that information above the line 68 and below the line 69 is eliminated, a continuous composite signal devoid of timing pulses results.

The recorded tape now contains a timing pulse located near each margin of the tape. The pulses are initially representative of a precise and known amount of time difference. Thus, if there is any expansion or contraction of the tape or other operating condition the time difference $\Delta t$ derived during playback will change considerably to indicate the variation. This change is detected and employed for controlling the position of the female guide 18 (FIGURE 1).

During reproduction, the data signals including the timing pulses are obtained from the first and second heads of the output of the preamplifiers 38 and 39 (FIGURE 2) prior to the switcher 42. The signals are applied to amplitude detector circuits 71 and 72 which serve to extract the timing pulses from the R-F envelopes. The timing pulse from detector circuit 72 for the second head is now applied through a delay line 73, having the same delay time as the delay means 47, to one input of a comparator 74 as a reference pulse while the timing pulse from the detector 71 is applied directly to the other input of the comparator 74. If no timing errors are introduced in the system by head wear, dimensional changes and the like, then the second and the reference pulses will be simultaneously applied to the comparator 74 and no output signal will be applied to the amplifier 76. However, if any changes (errors) in the timing information exist, a positive or negative error or control signal is derived, amplified by the amplifier 76 and applied to a guide motor drive 77. The motor drive 77 is mechanically linked to the female guide 18 and serves to urge the same inwardly and outwardly, as indicated by arrow 82, to compensate for the errors by changing the transverse dimension of the tape through stretching.

Because the timing pulses are at the opposite ends of adjacent transverse tracks, there is a readily available indication of the sense and amount of any tape distortion. Moreover, the effects of wear in the associated transducers are also indicated during the playback. Thus, when a correction is made in the position of the female guide 18 and the tape 7 relative to the heads 14, so as to minimize the control signal, all of these factors are simultaneously balanced. Note that there is no effect on the band of operation, because only redundant portions of the signals are used. In consequence, the individual transverse tracks are scanned at a substantially constant rate despite the absence of timing signals in the data. Further, switching proceeds smoothly from track to track, without gaps or repetition of parts of the data, so that the data signal is continuous.

The time base information contained in the relationship between the two pulses is used, but without affecting the output. Because the first of the paired timing pulses is associated with the second head, and because the switcher 42 derives data from the first head until after the first timing pulse is read, the switching to the second head for data then takes place, and the second pulse thereafter is derived from the first head. In practice, such systems operate with errors of less than $\pm 0.1$ microsecond.

Thus, there is provided a novel system in which timing errors are automatically compensated by comparing the time spacing of previously recorded pulses and deriving a control signal for positioning the tape guide.

What is claimed is:

1. A signal information recording system of the type in which separate transducing means, carried by a rotating assembly, sweep transversely across a record medium as it is moved longitudinally past the same to form a plurality of longitudinally spaced transverse tracks containing duplicate signal information at the end of one track and at the beginning of the next adjacent longitudinally spaced track including means for deriving timing pulses, related in time to the forming of the transverse tracks, means responsive to the timing pulses for adding timing information to the signal information being recorded by the transducing means, said means including means for providing a fixed time between successive timing information pulses and serving to add the timing information to the duplicate track portion at the end of one track and at the beginning of the next track.

2. A signal information recording system as in claim 1 in which said timing information is added first to the duplicate information at the beginning of the next track and then to the duplicate information at the end of the one track.

3. A signal information recording system of the type in which transducing heads, carried by a rotating assembly, sweep transversely across a record medium as it is moved longitudinally past the heads to form a plurality of longitudinally spaced transverse tracks containing duplicate signal information at the end of one track and at the beginning of the next adjacent longitudinally spaced track including means for deriving timing pulses and having means for providing a fixed time relation between pulses, and normally open gating means adapted to receive the signal information and apply the same to the transducing heads, said gating means being coupled to close in response to the timing pulses to cut off the flow of signal information to the transducing heads whereby the timing pulses appear as blanks in the signal information, said blanks appearing in the duplicate signal information at the end of one track portion and at the beginning of the next track portion representative of the fixed time relation.

4. A system as in claim 3 in which first and second gating means are associated with a pair of adjacent transducing heads for controlling application of signal information thereto, delay means being operatively associated with the first of said gating means and serving to delay the application of timing pulses to the same whereby the signal being recorded is blanked in the duplicate track portion at the beginning of the next track portion prior to being blanked in the duplicate track portion at the end of the preceding track.

5. A system as in claim 4 wherein said means for deriving timing pulses serves to form timing pulses in synchronism with rotation of the rotating transducing head assembly.

6. Apparatus as in claim 4 wherein said recording medium comprises magnetic tape and wherein said transducing means comprises a plurality of magnetic recording heads.

7. In a system for reproducing from a recording tape having longitudinally spaced transverse track portions having duplicate information at the end of one track and at the beginning of the next track, which duplicate information includes timing information respectively corresponding to the end of one track and the beginning of the next track as recorded on opposite side edges of the tape, the system including a rotating transducing head assembly adapted to cooperate with the transverse track portions and to reproduce the same as the tape is moved longitudinally past and on which a guide cups the tape for cooperation with the heads, the combination comprising first means adapted to receive the reproduced signal information and extract the recorded timing pulses from track portions along one side edge of the tape, second means receiving the reproduced signal information and extracting timing pulses along the opposite edge of the tape and forming reference pulses therefrom, comparator means coupled to said first and second means for receiving said extracted and reference pulses and forming a control signal that is indicative of the difference in timing between such pulses on adjacent track portions on opposite sides of the tape, and means for receiving said control signals and serving to control the position of the guide with respect to the head assembly so as to alter the transverse dimension of the tape.

8. A system as in claim 7 including switching means serving to sequentially switch from one transducing head to the other to eliminate duplicate information and form a composite recording void of duplicate information.

9. In a system for reproducing from a recorded medium having longitudinally spaced transverse track portions including duplicate signal information portions at each end with timing information occurring at the beginning of one track in the duplicate portion prior to the occurrence of the timing information in the duplicate portion at the end of the preceding track, said system including a rotating transducing assembly having at least a first and a second head adapted to cooperate with the track portions to reproduce the same including the timing information as the recording medium is moved longitudinally past and in which a guide means serves to cup the recording medium for cooperative relationship with the heads, the combination comprising delay means associated with the second head and serving to delay the reproduced timing pulses by an amount equal to the difference in time between the timing information as recorded on successive tracks, means for comparing the delayed timing pulses of the second head and reproduced timing pulses of the first head to form a control signal, and means responsive to the control signal for moving the guide to thereby control the pressure between the rotating heads and the recording medium, and alter the transverse dimension of the recording medium.

10. A system as in claim 9 wherein means are provided for deriving switching pulses in synchronism with the rotation of the rotating head assembly, and switching means responsive to said switching signal serving to switch from one reproducing head to another to eliminate duplicate information and form a composite reproduced recording.

11. A system as in claim 9 wherein the recording medium is a magnetic tape and wherein the transducing means comprises magnetic reproducing heads.

12. In a playback system for use with a magnetic tape which contains transverse recorded tracks of R–F signals having redundant portions on adjacent tracks and paired timing pulses defined by blank intervals in the redundant portions of the R–F signals which are separated by a selected timing interval to correspond to the end of a track at one side edge of the tape and the beginning of the next track at the other side edge of the tape during recording, the playback system including a rotating magnetic head assembly for scanning the tracks during longitudinal movement of the tape and a guide mechanism for controlling the relative position of the magnetic tape and the magnetic head assembly in order to vary the speed of scanning of a transverse track, means for controlling the guide mechanism to compensate for operational variations in timing comprising: first means for detecting the blank intervals along one side edge of the tape corresponding to the end of a track in the reproduced R–F signals, second means for detecting the blank intervals along the other side edge of the tape corresponding to the beginning of the next track for generating a reference pulse therefrom which is delayed by the selected timing interval, comparator means responsive to respective outputs of the first and second means for providing a control signal indicative of the relative difference in the time of occurrence thereof, and means responsive to the control signal for moving the guide mechanism and thus the tape relative to the magnetic head assembly to minimize the control signal.

References Cited in the file of this patent

UNITED STATES PATENTS

| | | |
|---|---|---|
| 2,751,439 | Burton | June 19, 1956 |
| 2,876,295 | Irby | Mar. 3, 1959 |
| 2,942,061 | Pfost et al. | June 21, 1960 |